United States Patent
Harper et al.

(10) Patent No.: US 9,258,191 B2
(45) Date of Patent: Feb. 9, 2016

(54) DIRECT NETWORK HAVING PLURAL DISTRIBUTED CONNECTIONS TO EACH RESOURCE

(71) Applicant: Microsoft Corporation, Redmond, WA (US)

(72) Inventors: David T. Harper, Seattle, WA (US); Eric C. Peterson, Woodinville, WA (US); Mark A. Santaniello, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

(21) Appl. No.: 13/712,995

(22) Filed: Dec. 13, 2012

(65) Prior Publication Data

US 2014/0169211 A1  Jun. 19, 2014

(51) Int. Cl.
*H04L 12/24* (2006.01)
*H04L 12/721* (2013.01)
*H04L 12/775* (2013.01)
*H04L 12/933* (2013.01)
*G06F 15/173* (2006.01)

(52) U.S. Cl.
CPC .............. *H04L 41/12* (2013.01); *G06F 15/173* (2013.01); *G06F 15/17381* (2013.01); *H04L 45/06* (2013.01); *H04L 45/58* (2013.01); *H04L 49/109* (2013.01)

(58) Field of Classification Search
None
See application file for complete search history.

(56) References Cited

U.S. PATENT DOCUMENTS

| | | | |
|---|---|---|---|
| 6,718,428 B2 | 4/2004 | Lee et al. | |
| 7,072,976 B2 | 7/2006 | Lee | |
| 7,925,802 B2 | 4/2011 | Lauterbach et al. | |
| 2003/0065821 A1 | 4/2003 | Lee | |
| 2004/0047360 A1* | 3/2004 | Myers | 370/406 |
| 2004/0049672 A1* | 3/2004 | Nollet et al. | 713/100 |
| 2004/0156322 A1* | 8/2004 | Mehra | 370/254 |
| 2008/0253085 A1* | 10/2008 | Soffer | 361/687 |
| 2009/0028172 A1* | 1/2009 | Scott et al. | 370/419 |
| 2010/0211721 A1 | 8/2010 | Resnick | |

FOREIGN PATENT DOCUMENTS

WO  2005/106668 A1  11/2005

OTHER PUBLICATIONS

S. Hsieh, T. Hsiao, The k-degree Cayley Graph and its Topological Properties, Networks vol. 47, Issue 1, pp. 26-36, Jan. 2006.*

(Continued)

*Primary Examiner* — Christopher Crutchfield
(74) *Attorney, Agent, or Firm* — Alin Corie; Sandy Swain; Micky Minhas

(57) ABSTRACT

A direct network is described in which each resource is connected to a switching fabric via a set of two or more routing nodes. The routing nodes are distributed so as to satisfy at least one inter-node separation criterion. In one case, the separation criterion specifies that, for each resource, a number of routing nodes that share a same coordinate value with another routing node in the set (in a same coordinate dimension) is to be minimized. In some network topologies, such as a torus network, this means a number of unique loops of the direct network to which each resource is connected is to be maximized. The routing provisions described herein offer various performance benefits, such as improved latency-related performance.

23 Claims, 7 Drawing Sheets

(56) References Cited

OTHER PUBLICATIONS

Ammendola, et al., "APEnet+: high bandwidth 3D torus direct network for petaflops scale commodity clusters," retrieved at <<http://arxiv.org/pdf/1102.3796.pdf>>, Feb. 18, 2011, 6 pages.

Morgan, Timothy Prickett, "AMD plots an end end run round Intel with SeaMicro's 'Freedom': Can cloud and virt move the battle off the chip?," retrieved at <<http://www.theregister.co.uk/2012/03/27/amd_seamicro_server_plans/>>, Virtualization, Mar. 27, 2012, 6 pages.

Balaji, et al., "Understanding Network Saturation Behavior on Large-Scale Blue Gene/P Systems," retrieved at <<http://www.mcs.anl.gov/uploads/cels/papers/P1671.pdf>>, Proceedings of the 2009 15th International Conference on Parallel and Distributed Systems, 2009, 8 pages.

International Search Report and Written Opinion for PCT/US2013/075175, mailed on Feb. 26, 2014, 10 pages.

Almohammad, et al., "Resource Placements in 2D Tori," In Proceedings of the First Merged International Parallel Processing Symposium and Symposium on Parallel and Distributed Processing, 1998, 8 pages.

Azeez, Babatunde, "Reliable Low Latency I/O in Torus Based Interconnection Networks," accessible at <<http://citeseerk.ist.psu.edu/viewdoc/download?doi=10.1.1.94.3466&rep=rep1&type=pdf>>, Masters Thesis, Texas A&M University, Dec. 2005, 69 pages.

* cited by examiner

DIRECT NETWORK HAVING PLURAL DISTRIBUTED CONNECTIONS TO EACH RESOURCE

BACKGROUND

A direct network has a network topology in which resources are connected together in a direct manner. More specifically, a direct network includes a plurality of routing nodes that are connected together by a plurality of communication links. The routing nodes and communication links define a switching fabric. Each resource is connected to the switching fabric via a single routing node. In operation, the direct network transmits a message between a source resource and a destination resource by passing the message along a direct path defined by a series of routing nodes. The length of the path is defined by its hop count, corresponding to the number of routing nodes that are traversed by the path.

The industry has recently proposed an alternative connection technique in which a single resource is connected to the switching fabric at plural contiguous (immediately adjacent) points in the switching fabric, instead of a single point. This modification is intended to increase the total amount of bandwidth between the resource and the switching fabric. However, this solution does not adequately address other performance-related issues that may affect a direct network.

SUMMARY

A direct network is described herein that includes a plurality of routing nodes, a plurality of communication links that connect the routing nodes together, and a plurality of resources. Each resource is connected to a set of two or more routing nodes. Further, the routing nodes in each set are distributed within a coordinate space defined by direct network so as to satisfy at least one inter-node separation criterion.

The above-described manner of connecting resources to routing nodes offers various performance-related benefits. For example, the direct network may exhibit improved latency-related performance, relative to a baseline case in which each resource is connected to a single routing node, or each resource is connected to a set of plural contiguous routing nodes. This is because the direct network provides more paths to choose from in sending a message from a source resource to a destination resource, increasing the chance that the network can find a relatively short path connecting the source resource and the destination resource.

Different inter-node separation criteria can be used to specify the separation of routing nodes in each set (with respect to a particular resource). In one case, the separation criterion specifies that, for each set of resource nodes, a number of routing nodes that share a coordinate value with another resource node in the set (in a same coordinate dimension) is to be minimized. In some direct network topologies (such as a torus topology), this criterion can be restated as specifying that a number of unique loops in the direct network to which each resource is connected is to be maximized.

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative direct network in which each resource is coupled to plural distributed routing nodes. Section B describes illustrative methods which explain the construction and operation of the functionality of Section A. Section C describes illustrative computing functionality that can be used to implement any aspect of the features described in Sections A and B.

Figure 7:
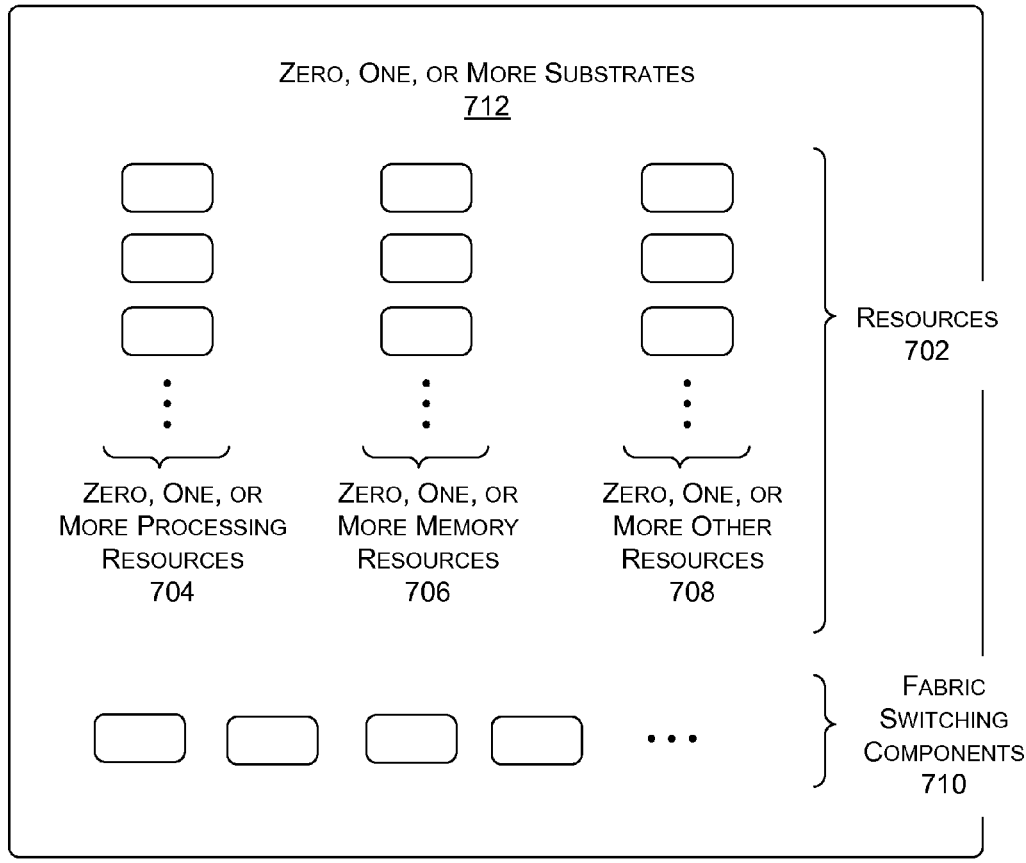
FIG. 7 shows various physical implementations of the direct network shown in FIG. 1, 2 or 3.
Figure 8:
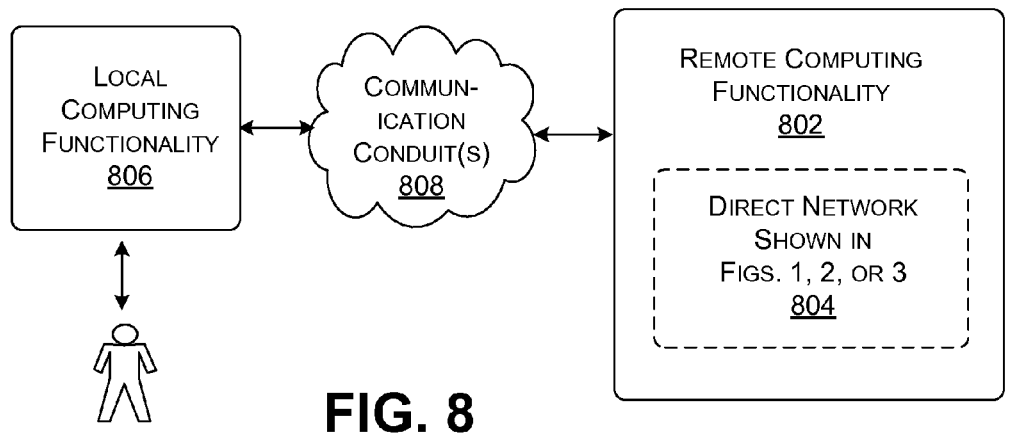
FIG. 8 shows an illustrative system which employs the type of direct network shown in FIG. 1, 2 or 3.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIGS. 7 and 8, to be described below, provide additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Direct Network

An improved direct network is described herein. In general, a direct network has a network topology in which resources are directly connected together via a plurality of routing nodes and communication links. Without limitation, examples of direct networks include linear array networks, mesh networks, k-ary n-cube networks, Cayley graph networks, and so. A k-ary n-cube network, also referred to as a torus network, corresponds to a cube of routing nodes having n dimensions, with k routing nodes on each dimension. Particular types of k-ary n-cube networks include ring networks, 2-D torus networks, hypercube networks, etc. In contrast, an indirect network provides at least one switching node that is not associated with a resource, but, rather, performs only a switching function. One type of indirect network corresponds to a hierarchical tree, where one or more top levels of the tree correspond to switching nodes that perform the sole function of directing network traffic to and from resources associated with the terminal nodes of the tree.

Further note that, in some cases, a direct network can be connected to another type of network, such as an indirect network. Alternatively, or in addition, the direct network can otherwise incorporate one or more features of another type of network, such as an indirect network. As defined herein, a direct network corresponds to a network that incorporates aspects of direct network topology, with or without other features associated with other kinds of networks.

Figure 1:
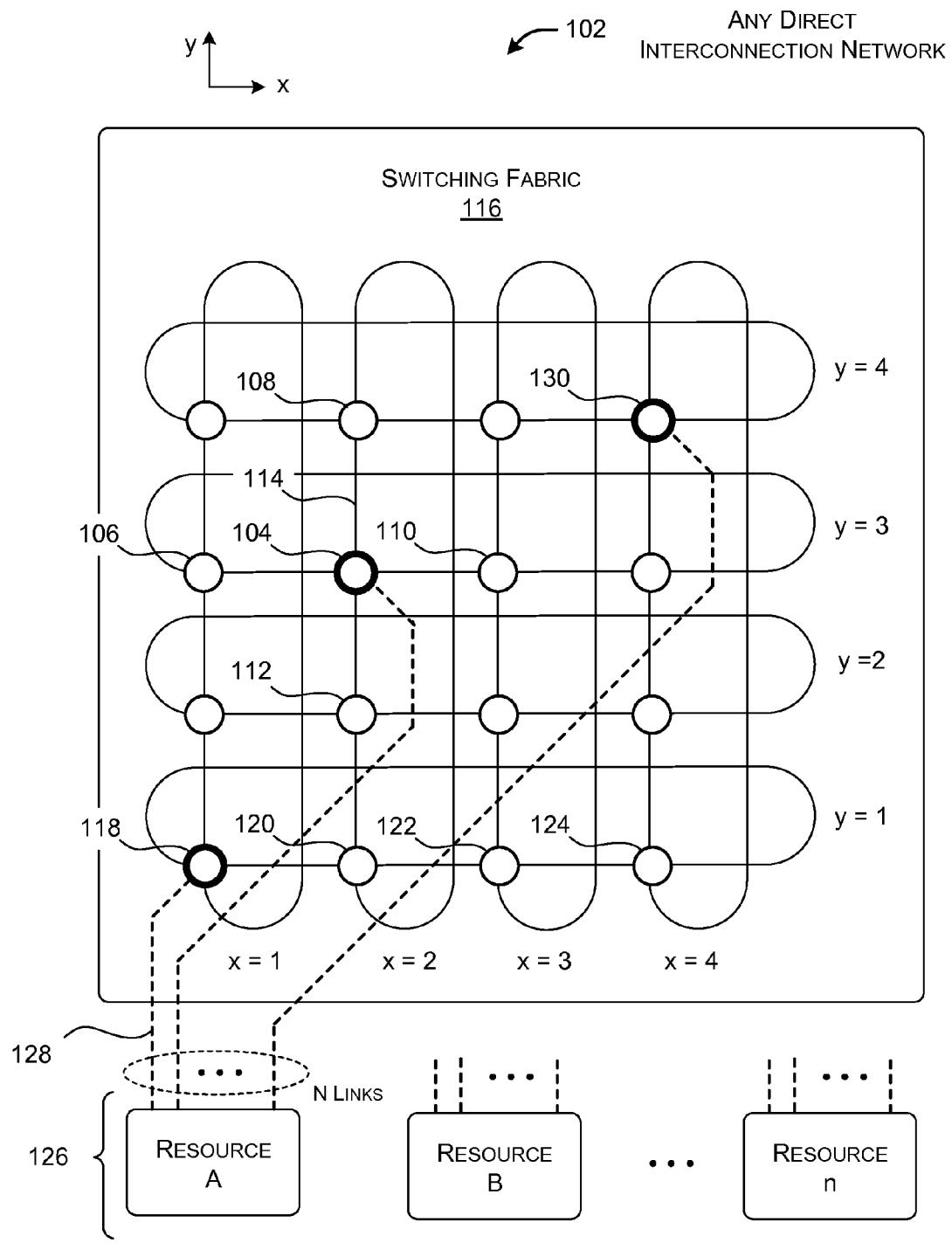
FIG. 1 shows an illustrative direct network in which each resource is connected to a switching fabric via two or more spaced-apart routing nodes.

FIG. 1 illustrates a two-dimensional torus-type direct network 102 (more specifically, a 4-ary 2-cube direct network). The direct network 102 includes a plurality of routing nodes, such as representative routing node 104. The direct network 102 also includes a plurality of communication links that couple the routing nodes together, such as representative communication link 114. More specifically, in this type of two-dimensional network, each routing node is coupled to four other routing nodes to the "west," "north," "east," and "south," with respect to the routing node. For example, the routing node 104 is connected to the routing nodes 106, 108, 110, and 112 via four respective communication links. Depending on a particular implementation, any individual communication link can be bi-directional (permitting message flow in both directions) or uni-directional (permitting message flow in one direction). The collection of routing nodes and communication links may also be referred to as a switching fabric 116 of the direct network 102.

Further, the particular type of direct network 102 shown in FIG. 1 can be interpreted as including a plurality of loops in its two dimensions, x and y. Each loop connects a series of routing together in a ring. For example, consider the loop for which y=1. That loop contains the routing nodes 118, 120, 122, and 124. Overall, the direct network 102 includes four loops in the y dimension loops (for y=1, y=2, y=3, and y=4), and four loops in the x dimension (for x =1, x=2, x=3, and x=4). The term "x loop" refers to a loop in which the constituent routing nodes have coordinates that share the same x value. The term "y loop" refers to a loop in which the constituent routing nodes have coordinates that share the same y value. In other direct networks, such as a mesh network, the routing nodes along any dimension do not form a ring, e.g., because the "last" routing node in a particular dimension is not connected to the "first" routing node" in that dimension.

The direct network 102 also includes a set of resources 126 that connect to the switching fabric 116 via resource links. For example, an illustrative resource link 128 connects the resource link to the routing node 118. The resources 126 may correspond to any equipment or functionality, including, but not limited to, any combination of processing resources, memory resources, communication-related resources, etc.

More specifically, each resource in the set of resources is connected to a set of K routing nodes in the switching fabric 116, where K>2. (From the opposite perspective, each routing node can be connected to zero, one, or more resources.) For example, without limitation, K=8 routing nodes in one case. For instance, the resource A connects to at least three routing nodes, including routing node 118, routing node 104, and routing node 130. As a further characteristic, the K routing nodes (to which a particular resource is coupled) are dispersed within a coordinate space defined by the network topology of the direct network 102. Generally stated, the K routing nodes are spread out in a manner that satisfies at least one inter-node separation criterion. In contrast, in a conventional direct network, each resource is connected to a single routing node in its switching fabric.

Different inter-node separation criteria can be used to govern the selection of the K routing nodes. For example, the direct network 102 can adopt any criterion, or any combination of criteria, selected from the following non-exhaustive list.

Minimum shared loop criterion. In one case, the separation criterion specifies that, for each set of K routing nodes, a number routing nodes that share a same coordinate value with another routing node in the set (with respect to a same coordinate dimension) is to be minimized. In some cases, the separation criterion can more strongly specify that no pair of routing nodes in a set is permitted to share the same coordinate value with respect to the same coordinate dimension. For the type of torus network shown in FIG. 1, this criterion can be restated as specifying that a number of unique loops to which each resource is connected is to be maximized. Or this criterion can be more strongly stated as specifying that any loop within the direct network topology is to contain no more than a prescribed number of routing nodes from a set of K routing nodes. For example, the prescribed number may be 1.

Consider, for example, the set of three routing nodes (118, 104, and 130) shown in FIG. 1, which connect the resource A to the switching fabric 116. Note that the routing node 118 is a member of the x=1 loop and the y=1 loop, and these two loops contain no other members of the set of K routing nodes for resource A. Further, the routing node 104 is a member of the x=2 loop and the y=3 loop, and these two loops contain no other members of the set of K routing nodes for resource A. And finally, the routing node 130 is a member of the x=4 and y=4 loop, and these two loops contain no other members of the set of K routing nodes for resource A. So far, the direct network 102 satisfies the non-shared loop criterion because the resource A is connected to three unique loops of the direct network 102. The loops are said to be unique because they contain no more than one routing node from the set of K routing nodes associated with resource A.

Non-contiguous criterion. In another case, the separation criterion specifies that, for each set, a number of pairs of routing nodes that are contiguous with respect to each other is to be minimized. For example, this separation criterion can specify that, for each set, no pair of routing nodes is permitted to be contiguous (immediately adjacent) to each other. In the example of FIG. 1, no member of the set of K routing nodes for the resource A is immediately adjacent to any other member. Therefore, the direct network 102 satisfies the non-contiguous criterion.

Path length criterion. In another case, the separation criterion is specified in terms of a path length between each pair of routing nodes in the set of K routing nodes. For example, the separation criterion can specify that the path length between any pair of routing nodes cannot be smaller than a prescribed minimum path length. Or the separation criterion can entail computing the path length between each possible pair of the K routing nodes, and then forming an average of these path lengths; the separation criterion specifies that the average path length is to be maximized.

In general, a path length can be measured in different ways. In one approach, the path length is measured as the minimum number of hops that are performed in traveling from one member of a pair of routing nodes to the other member of the pair. For example, consider the pair corresponding to the routing node 104 and the routing node 118. The hop count for this path is 3 because the minimum path that connects these two nodes (104, 118) includes two routing nodes in the y dimension and one node in the x dimension. In another case, a path length can be specified as a Euclidean distance in a coordinate space defined by the routing nodes.

Entropy criterion. In another case, for each set, the separation criterion specifies that a degree of disorder in the set of K routing nodes is to be maximized, or that the degree of disorder in the set is to satisfy a prescribed minimum threshold. That degree of disorder is referred to herein as entropy or randomness. Alternatively, a single entropy measure can be specified for the direct network 102 as a whole. For example, if there are n resources, and each resource is connected to K routing nodes, then the entropy measure specifies a degree of disorder in the distribution of the n*K routing nodes.

Performance criterion. In another case, the separation criterion may be expressed in terms of a performance goal that the direct network 102 is expected to meet when it is used to transmit messages between resources. In one case, the performance goal can be specified for each pair of resources connected to the direct network. Alternatively, or in addition, the performance goal can be specified in the context of the performance of the network as a whole. In both cases, without limitation, the performance goal can be specified in terms of a latency measure.

For instance, the performance goal can specify that the observed communication between each individual pairing of possible resources is not to exceed a prescribed average latency measure. Or, more generally, the performance goal can specify that the average latency between each pair of possible resources is to be minimized. Assume, for example, that a first resource of a pair of resources is connected to the switching fabric 116 via K routing nodes, and a second resource of the pair is likewise connected to the switching fabric 116 via another K routing nodes. Any distribution of the 2*K nodes associated with this pairing is acceptable so long as it satisfies the kind of latency-related performance goal specified above.

Alternatively, or in addition, the performance goal can specify that communication between all possible pairings of resources is not to exceed a prescribed average latency measure. Or, more generally, the performance goal can specify that average latency within the direct network 102 as a whole is to be minimized. Assume, for example, that there are n resources. This means that any distribution of the n*K resource nodes associated with the n resources is acceptable so long as the resultant direct network 102 satisfies the above-described type of global latency measure.

The above-described criteria are cited by way of illustration, not limitation. Other implementations can adopt other ways of dispersing nodes through the switching fabric 116. Further note that a direct network that satisfies a first inter-node separation criterion may also satisfy one or more other inter-node separation criteria.

Further, as in the performance-based example stated above, any criterion can be specified in a local and/or global context. In a local context, the criterion can be specified in terms of the connections associated with one or more particular resources. In the global context, the criterion can be specified in the context of all of the connections that link the resources 126 to the switching fabric 116.

The connection strategy shown in FIG. 1 may confer various benefits. For example, the connection strategy may improve the latency-related performance of the direct network 102. This is because the connection technique expands the number of routing options that can be used when sending a message from a source resource to a destination resource. This increases the chances that the direct network 102 can find a relatively short path between the source resource and the destination resource.

Assume, for example, that resource B is connected to at least the resource node 120 (where that connection is not shown in FIG. 1). Further assume that it is desired to transmit a message from resource B to resource A. The direct network 102 can choose to transmit the message from the routing node 120 to the routing node 118, which defines a path of only one hop count. This option would not be available if the resource A was connected via a single link to, for instance, the resource node 130.

More specifically, in a direct network in which each resource is connected to a single point in the switching fabric, the communication latency between resources increases in proportion to the cube root of the number of resources in the direct network. As a data center scales, the latency in the direct network can increase to unsatisfactory levels. The connection strategy shown in FIG. 1 eliminates or reduces this problem.

In addition, or alternatively, the connection strategy can improve the fault tolerance of the direct network 102. This is because the failure of any routing node will not entirely prohibit communication to and from a resource that is coupled to this routing node.

In addition, or alternatively, the connection strategy can increase the bandwidth that is available for transmitting messages to and from each resource. For example, if the bandwidth of each link is b, the connection strategy offers K*b total bandwidth to and from each resource.

In addition, or alternatively, the connection strategy can reduce the traffic through the switching fabric 116. This benefit complements the latency-related advantage described above. That is, the connection strategy provides, on average, shorter paths between pairs of communicating resources. Shorter paths result in reduced traffic over the communication links of the switching fabric 116.

The above-described benefits are cited by way of example, not limitation. Other implementations may offer additional benefits.

Figure 2:
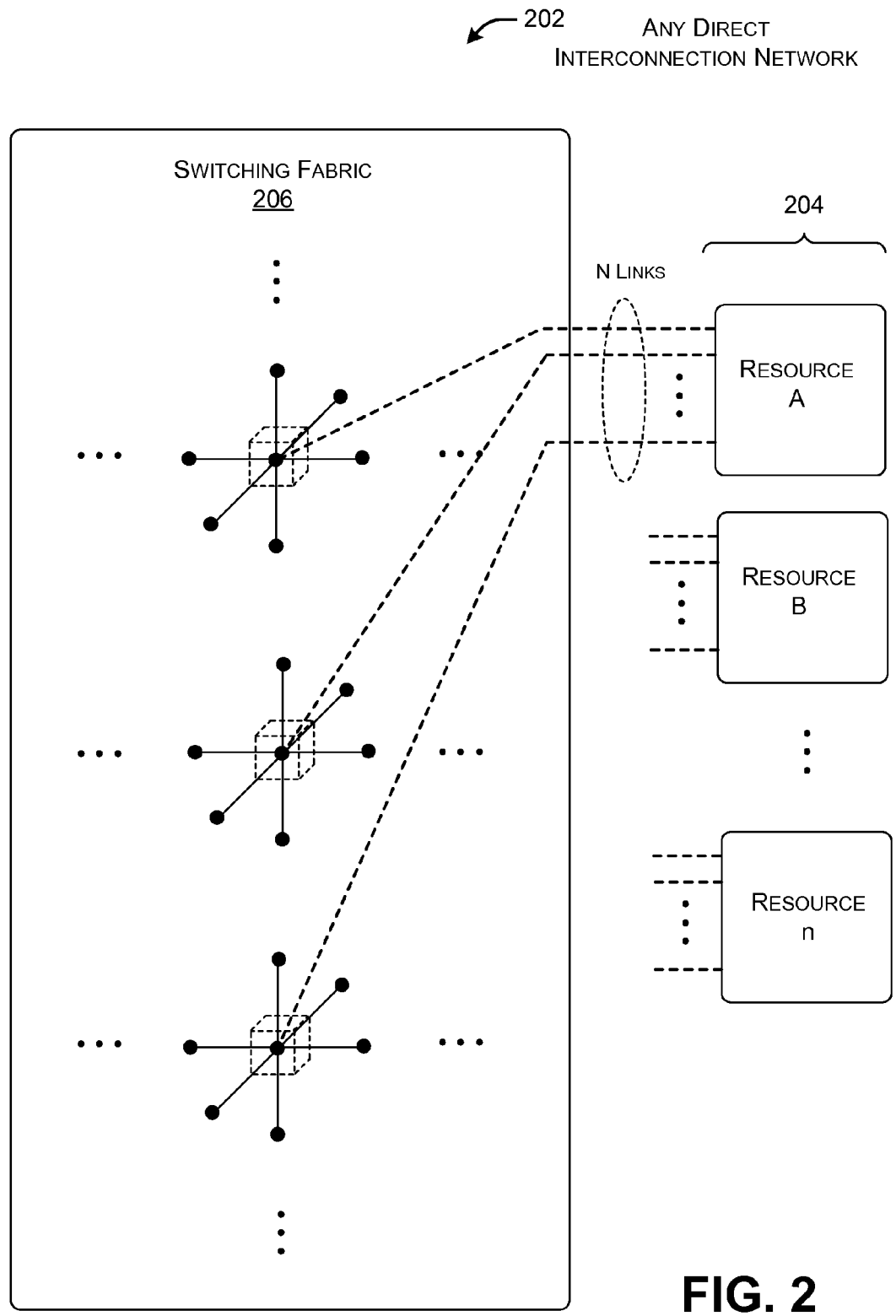
FIG. 2 shows another illustrative direct network in which each resource is connected to a switching fabric via two or more spaced-apart routing nodes.

FIG. 2 shows a representative portion of another direct network 202 in which each of a plurality of resources 204 is connected to the network's switching fabric 206 via K routing nodes. In the case of FIG. 2, each routing node is coupled to six other neighboring routing nodes (instead of four in the case of FIG. 1). For example, the direct network 202 of FIG. 2 may correspond to a three-dimensional torus-type network.

The direct network 202 can use any inter-node separation criterion (or any combination of criteria) described above to determine the distribution of the K routing nodes, for each resource. For the non-shared loop criterion, the direct network 202 offers a collection of z-loops, in addition to x-loops and y-loops. The rule otherwise applies in the same manner as stated above: the designer will attempt to maximize the number of unique loops to which each resource is connected.

Figure 3:
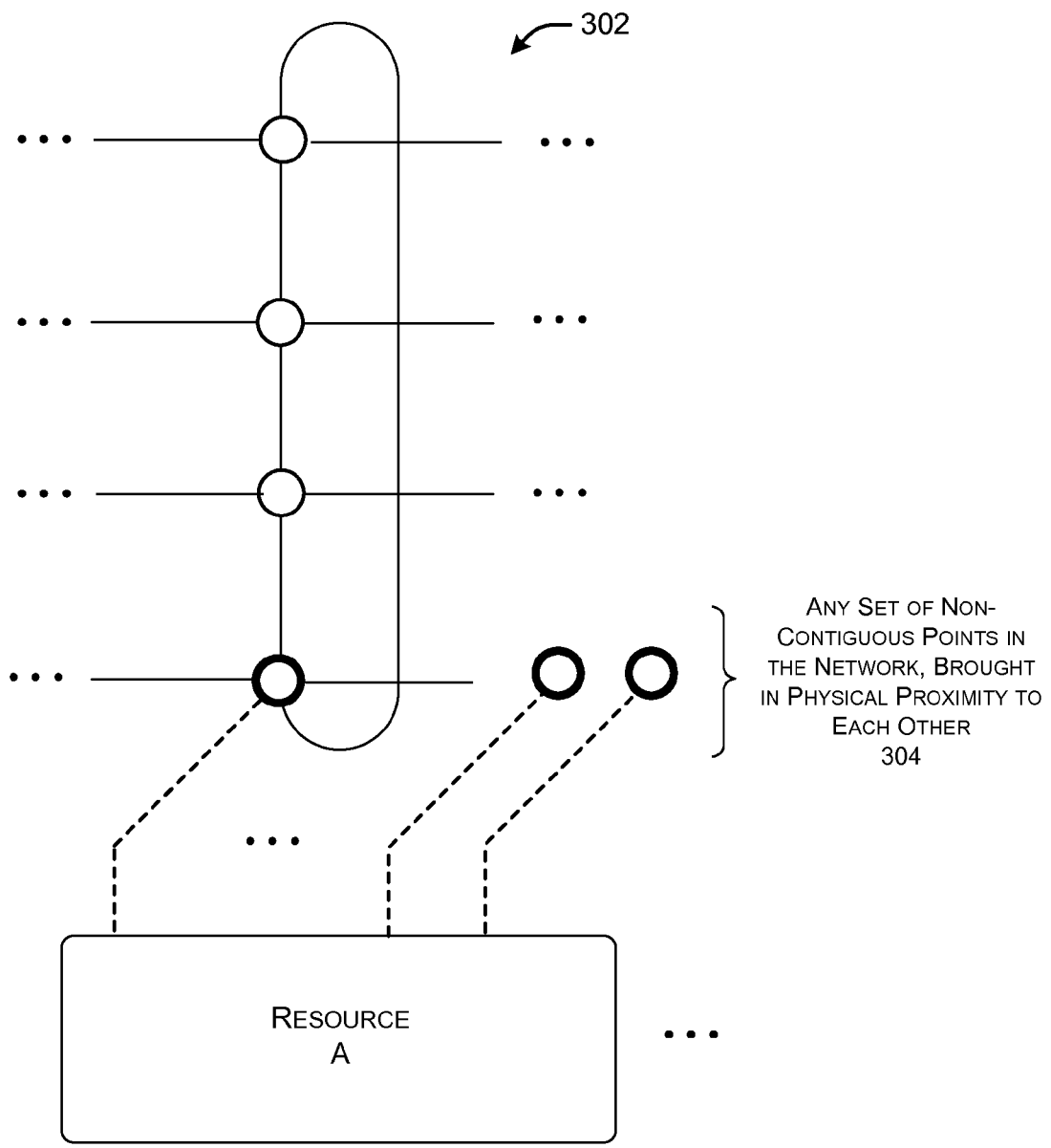
FIG. 3 shows, in high-level form, a manner of physically grouping a set of routing nodes together, where that set of routing nodes is connected to the same resource.

FIG. 3 shows a small portion of any direct network 302. The direct network 302 couples each resource to the switching fabric of the direct network 302 via K routing nodes 304 in the manner described above with respect to FIGS. 1 and 2. For example, the representative resource A is connected to the switching fabric via the K routing nodes 304, and those routing nodes 304 are spaced apart according to at least one inter-node separation criterion specified above.

In addition, FIG. 3 indicates that a designer of the direct network may use a distance-based criterion (or plural criteria) that place constraints on the physical placement of each set of K routing nodes. More specifically, the inter-node separation criteria described above pertain to the separation of routing nodes in the coordinate space defined by the direct network topology. The separation of two nodes in coordinate space does not necessarily dictate the manner in which the nodes are separated in physical space. This is because the routing nodes can be assigned to any physical positions, insofar as they are connected together in the manner specified by the network's switching fabric. For example, consider the case of a torus network that includes a plurality of loops. The designer of the torus network can fold, bend, compress, and/or stretch any loop to achieve various physical positions of the routing nodes within the loop.

One physical distance-based criterion may specify that, for each set of K routing nodes, the physical distance between any pair of the K routing nodes is not to exceed a prescribed maximum distance. Or the criterion can specify that a cluster formed by the K routing nodes is to have a cluster-strength measure which exceeds a prescribed minimum cluster-strength measure, and so on. Many other environment-specific distance-based criteria can be formulated. In general, a designer may wish to group the K nodes associated with a resource together so as to simplify the wiring between the resource and the direct network's switching fabric. This physical grouping may also improve the performance of the direct network.

Figure 4:
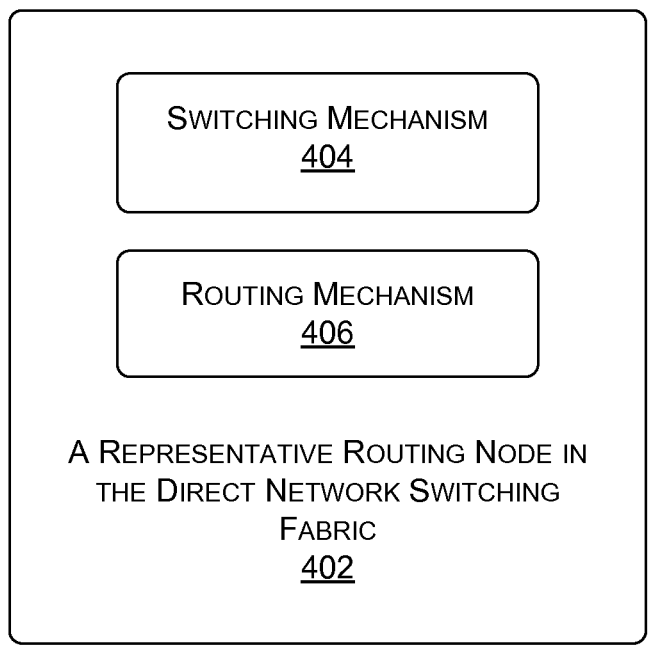
FIG. 4 shows an illustrative implementation of a routing node for use in the direct network shown in FIG. 1, 2 or 3.

FIG. 4 provides a high-level depiction of a routing node 402 in the switching fabrics (116, 206) shown in FIG. 1, 2, or 3. Assume that the routing node 402 is connected to at least one resource. (And, as noted, each resource is connected to plural such routing nodes.)

In one case, at least part of the logic shown in FIG. 4 can be implemented by a mechanism that is separate from a resource to which the routing node 402 is connected. Alternatively, or in addition, at least part of the logic can be implemented by the resource itself. For example, assume that the resource corresponds to a processor or the like. The processor can implement at least some of the functions of the routing node 402, together with other functions.

In one implementation, the routing node 402 can include a switching mechanism 404 and a routing mechanism 406. The switching mechanism 404 can receive a message that is propagated to the routing node 402 from any connected source routing node, and then forward the message to any connected destination routing node. For example, assume that the routing node 402 of FIG. 4 corresponds to the routing node 104 of FIG. 1. In that case, the switching mechanism 404 includes logic for receiving a message from any connected routing node (e.g., routing nodes 106, 108, 110, and 112), and then for forwarding the message to any connected routing node (again, any of routing nodes 106, 108, 110, and 112). The switching mechanism 404 can also handle communication to and from the resource (or plural resources) that is/are associated with the routing node 402, if any. The switching mechanism 404 can be implemented in any manner, e.g., using hardware logic circuitry and/or software-driven functionality.

The routing mechanism 406 plays a role in choosing the path that a message takes in traversing the switching fabric of a direct network. The routing mechanism 406 can apply any routing technique or combination of techniques to perform this function, including any deterministic routing technique(s) and/or adaptive routing technique(s). Deterministic routing techniques use a predetermined path to route a message between a pair of routing nodes. Adaptive routing techniques may adapt a routing path based on a current state of the direct network, as the message traverses the switching fabric.

Consider the following merely representative deterministic routing technique. Each routing node can store a table which identifies a set of paths that can be used to transmit a message from that routing node to each destination resource, together with cost values associated with those paths. A source routing node can use its table to determine an appropriate path when it is asked to transmit a message to a particular destination resource. In one case, the routing mechanism 406 of the source routing node can append path information to the message which specifies the desired path, optionally together with alternative backup paths. The routing nodes along the selected path can then interpret the instructions to route the message along the desired path until the message reaches the desired destination.

In other routing techniques, each routing mechanism 406 can make more local decisions regarding the path that the message takes through the network. For example, the routing mechanism 406 of the routing node 104 of FIG. 1 can confine its analysis to selecting a recipient node among one of the neighboring routing nodes (106, 108, 110, 112), given an ultimate specified goal of sending the message to a particular destination resource. Other routing nodes in the path can make the same kind of local determination.

B. Illustrative Processes

Figure 5:
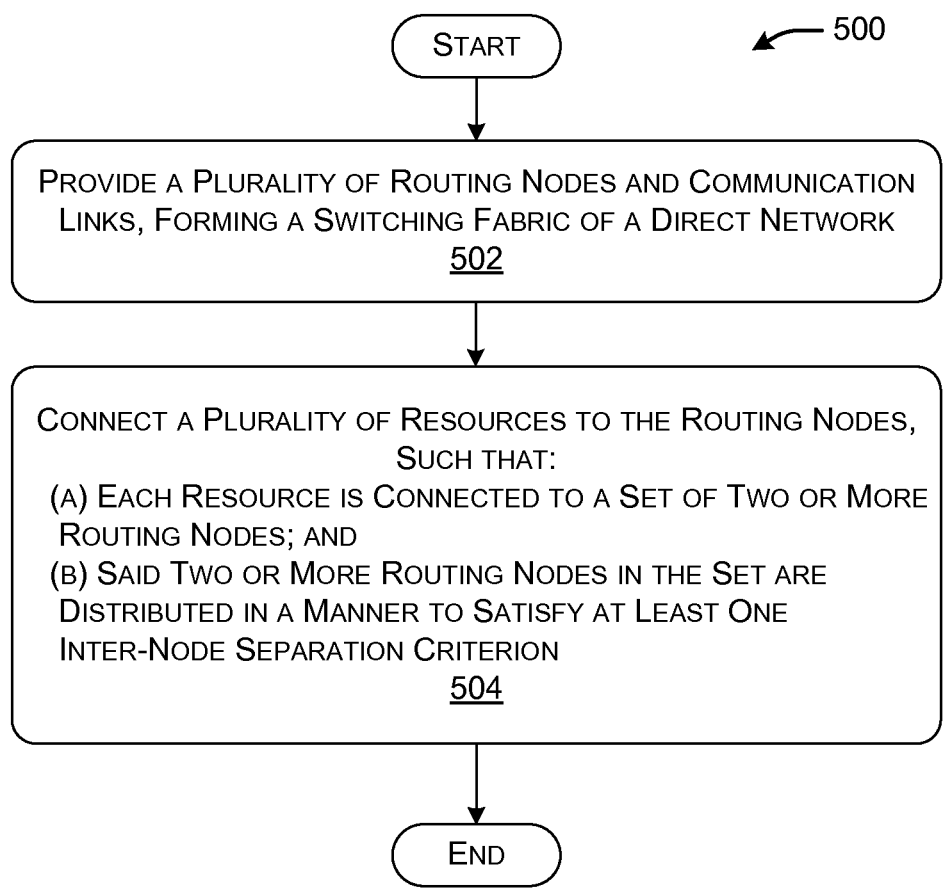
FIG. 5 shows a procedure for creating a direct network having the characteristics shown in FIG. 1, 2 or 3.
Figure 6:
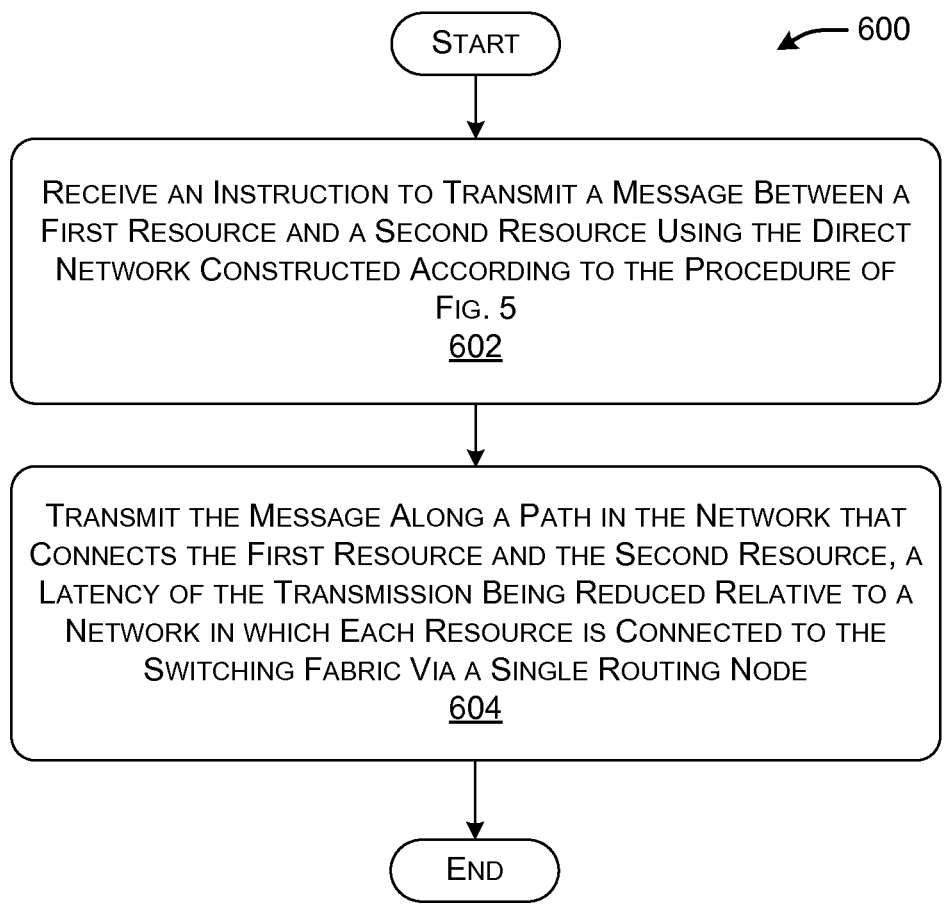
FIG. 6 shows a procedure which describes the operation of the direct network shown in FIG. 1, 2 or 3.

FIGS. 5 and 6 show procedures that complement the structure-related detail provided in FIGS. 1-4. Since the principles underlying the direct networks have already been described in Section A, certain operations will be addressed in summary fashion in this section.

Starting with FIG. 5, this figure shows an illustrative procedure 500 that sets forth one manner of constructing the type of direct network shown in FIG. 1, 2, or 3. In block 502, a designer provides a plurality of routing nodes and communication links, forming a switching fabric of a direct network. In block 504, the designer connects a plurality of resources to the switching fabric. The connection is made such that: (a) each resource is connected to a set of K routing nodes, with K≥2; and (b) the K routing nodes in the set are distributed in a manner that satisfies at least one inter-node separation criterion. Illustrative inter-node separation criteria were described in Section A. In addition, the connection may be made to satisfy one or more physical distance-related criteria, e.g., to ensure that the K routing nodes are in sufficiently close physical proximity to each other.

A designer can use different approaches to perform the procedure 500 of FIG. 5. In one case, a designer can manually choose the K routing nodes associated with each resource. In another case, a designer can rely on one or more automated tools to select the K routing nodes for each resource. One technique can randomly select connection points in the switching fabric for each of the resources. Some of the selections will satisfy the inter-node separation criterion (or criteria), and other selections will not. The technique can output those solutions which satisfy the inter-node separation criterion (or criteria), or which most effectively satisfy the inter-node separation criterion (or criteria). In another case, the technique can apply any kind of iterative solving technique to select a combination of connection points which satisfies the inter-node separation criterion (or criteria), such as, but not limited to, the Expectation-Maximization (EM) algorithm.

FIG. 6 shows a procedure 600 that explains one manner of operation of the type of direct network shown in FIG. 1, 2, or 3. In block 602, the direct network receives an instruction to transmit a message between a first resource and a second resource. In block 604, the direct network selects a routing path through the direct network from the first resource to the second resource. The direct network then transmits the message along that path. The direct network can adopt any deterministic and/or adaptive routing technique to perform this routing operation. The path that is chosen may be relatively short; this is a result of connecting each resource to K points in the switching fabric of the direct network. The shortened path may contribute to reduced latency, relative to the case in which each resource is connected to the switching fabric via a single point.

C. Representative Direct Network Equipment

FIG. 7 summarizes various ways of physically implementing the type of direct network shown in FIG. 1, 2, or 3. The direct network includes resources 702 of any type of any combination of types. For example, the resources 702 can include a collection of processing resources 704, and/or a collection of memory resources 706, and/or a collection of any other resources 708. For example, the processing resources 704 can include central processing units (CPUs), graphical processing units (GPUs), logic circuitry of any type, gate arrays of any type, etc. The memory resources 706 can include RAM memory, ROM memory, hard disk modules, optical disk modules etc. The other resources can include, for instance, communication equipment of any type, such as routers, gateways, etc. Each resource can be connected to multiple resource links using, for example, a multi-pole switch of any type.

The direct network also includes the components of the network's switching fabric, referred to in FIG. 7 as fabric switching components 710. Those components 710 can include routing nodes, communication links, and so on. The routing nodes may include switching and routing logic which is separate from and/or integrated with the resources associated with the routing nodes. The communication links may correspond to communication conduits of any type, such as any combination of copper-based wires or cables, optical cables, etc. Alternatively, or in addition, the communication links may correspond to directed wireless communication links of any type. Likewise, the resource links can be implemented using any type of physical communication links.

In one case, the resources 702 and fabric switching components 710 are not affixed to any common substrate(s). For example, the resources 702 may represent physically separate components. The communication links and resource links couple these physically separate resources 702 together. For example, the resources 702 may represent servers that are coupled together via the communication and resource links.

In another case, the resources 702 and/or the fabric switching components 710 may be affixed to one or more substrates 712. For example, the substrate(s) may correspond to printed circuit board(s), and/or semiconductor chip(s), etc. More specifically, in one case, a single substrate may integrate the resources 702 and the fabric switching components 710. In another case, a first common substrate may integrate the resources 702 together, and a second common substrate may integrate the fabric switching components 710 together. In this latter case, resource links may connect the resources 702 in the first substrate with appropriate resource nodes in the second substrate. Still other implementations are possible.

FIG. 8 shows an implementation in which remote computer functionality 802 provides a direct network 804. That direct network 804, in turn, provides access to a plurality of resources that are coupled together using the type of interconnection technique described in Section A. A user may employ local computing functionality 806 to access the direct network 804 via a communication conduit 808 of any type. For example, the local computing functionality 806 may correspond to a personal computer, a smart phone, etc. The communication conduit 808 may correspond to a wide area network (e.g., the Internet), a local area network, and so on. In another case, a local user (not shown) may interact with the direct network 804 via a local user device or any other interface mechanism.

In closing, the description may have described various concepts in the context of illustrative challenges or problems. This manner of explanation does not constitute an admission that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A direct network, comprising:
a plurality of routing nodes;
a plurality of communication links that connect the routing nodes together to form a direct network topology; and
a plurality of resources connected to corresponding sets of two or more routing nodes of the plurality of routing nodes,
wherein the two or more routing nodes of the corresponding sets are dispersed within a coordinate space defined by the direct network topology so as to satisfy at least one inter-node separation criterion that comprises one or more of:
a first inter-node separation criterion specifying that the number of routing nodes in an individual corresponding set that share a coordinate value in the same coordinate dimension with another routing node in the individual corresponding set is minimized,
a second inter-node separation criterion specifying that the number of pairs of routing nodes from the individual corresponding set that are contiguously arranged with respect to each other is minimized,
a third inter-node separation criterion specifying that the number of pairs of routing nodes from the individual corresponding set that are contiguously arranged with respect to each other is zero,
a fourth inter-node separation criterion specifying that path lengths between pairs of routing nodes in the individual corresponding set satisfy a path length constraint, wherein path length is measured in hop counts, or
a fifth inter-node separation criterion specifying that a distribution of the routing nodes in the individual corresponding set satisfies an entropy constraint.

2. The direct network of claim 1, wherein the direct network topology is a k-ary n-cube network topology.

3. The direct network of claim 1, wherein the direct network topology is a Cayley network topology.

4. The direct network of claim 1, wherein the plurality of resources includes one or more resources selected from:
processing resources;
memory resources; and
communication resources.

5. The direct network of claim 1, wherein the two or more routing nodes of the corresponding sets are dispersed with the coordinate space so as to satisfy the first inter-node separation criterion.

6. The direct network of claim 1, wherein the direct network topology is formed on a common substrate.

7. The direct network of claim 6, wherein the common substrate is a semiconductor chip.

8. The direct network of claim 1, wherein the two or more routing nodes of the corresponding sets are dispersed within the coordinate space so as to satisfy the second inter-node separation criterion.

9. The direct network of claim 1, wherein the two or more routing nodes of the corresponding sets are dispersed within the coordinate space so as to satisfy the third inter-node separation criterion.

10. The direct network of claim 1, wherein the two or more routing nodes of the corresponding sets are dispersed within the coordinate space so as to satisfy the fourth inter-node separation criterion.

11. The direct network of claim 1, wherein the two or more routing nodes of the corresponding sets are dispersed within the coordinate space so as to satisfy the fifth inter-node separation criterion.

12. The direct network of claim 1, wherein the two or more routing nodes of the corresponding sets are dispersed within the coordinate space so as to satisfy a sixth inter-node separation criterion specifying that the direct network is to exhibit a prescribed latency performance.

13. The direct network of claim 1, wherein, for each resource, the routing nodes in the corresponding sets also satisfy at least one distance-based separation criterion which places a constraint on a physical distance between pairs of routing nodes in the corresponding sets.

14. A method of constructing a direct network, comprising:
providing a plurality of routing nodes;
providing a plurality of communication links that connect the routing nodes together to form a direct network topology; and
connecting a plurality of resources to the routing nodes such that:
each resource is connected to a set of two or more routing nodes, and
said two or more routing nodes in the set are distributed so as to minimize a number of routing nodes that share a coordinate value, in a same coordinate dimension, with another resource node in the set.

15. The method of claim 14, wherein the direct network is formed on at least one common substrate.

16. The method of claim 15, wherein said at least one common substrate is a semiconductor chip.

17. The method of claim 15, wherein said at least one common substrate is a circuit board.

18. A direct network, comprising:
a plurality of routing nodes;
a plurality of communication links that connect the routing nodes together to form a direct network topology; and
a plurality of sets of resource links,
wherein respective sets of resource links couple respective sets of two or more routing nodes to a respective resource, and
wherein the routing nodes are distributed within a coordinate space defined by the direct network topology such that, for an individual respective set of two or more routing nodes:
no pair of routing nodes in the individual respective set share the same coordinate value for a particular coordinate dimension, or
no more than a prescribed number of routing nodes in the individual respective set are contiguously arranged with respect to each other.

19. The direct network of claim 18, wherein for each respective set of two or more routing nodes, said two or more routing nodes in the respective set are distributed such that no pair of routing nodes in the respective set share the same coordinate value with respect to the particular coordinate dimension.

20. The direct network of claim 18, wherein for each respective set of two or more routing nodes, no more than the prescribed number of routing nodes from the respective set are contiguously arranged with respect to each other.

21. A direct network, comprising:
a plurality of routing nodes;
a plurality of communication links that connect the routing nodes together to form a direct network topology; and
a plurality of resources connected to corresponding sets of two or more routing nodes of the plurality of routing nodes,
wherein the two or more routing nodes of the corresponding sets are dispersed within a coordinate space defined by the direct network topology so as to satisfy at least one distance-based separation criterion which places a constraint on a physical distance between pairs of routing nodes in the corresponding sets.

22. The direct network of claim 21, wherein the direct network topology is a k-ary n-cube network topology.

23. The direct network of claim 22, formed on a common substrate.

* * * * *